United States Patent [19]

Terry

[11] 4,439,637

[45] Mar. 27, 1984

[54] LOW LOOP CURRENT SWITCH LATCH CIRCUIT

[75] Inventor: Michael B. Terry, Denton, Tex.

[73] Assignee: Mostek Corporation, Carrollton, Tex.

[21] Appl. No.: 335,145

[22] Filed: Dec. 28, 1981

[51] Int. Cl.[3] ................................................ H04B 3/36

[52] U.S. Cl. ................................. 179/16 F; 179/81 B

[58] Field of Search .............. 179/16 F, 16 AA, 81 R, 179/81 A, 170 R, 81 B

[56] References Cited

U.S. PATENT DOCUMENTS 3,781,481 12/1973 Shaffer et al. .................... 179/16 F

*Primary Examiner*—A. D. Pellinen

*Assistant Examiner*—James L. Dwyer

[57] ABSTRACT

A low loop current switch latch circuit (10) monitors a residual current which is derived from a telephone line and is proportional to the current drawn by a telephone subscriber circuit. Bipolar transistors (20, 26) are connected to produce a proportional current to the residual current. A current mirror circuit includes a master transistor (30) and a slave transistor (32). The proportional current is drawn through the master transistor (30). The current produced by the slave transistor (32) is provided to a node (33). A constant power source (36) provides a constant current to a node (39). A pair of cross-coupled transistors (40, 46) are connected to the nodes (33, 39) such that the cross-coupled transistors are set to first and second states as a function of the current derived from the slave transistor (32). A bias current transistor (52) is activated by the cross-coupled transistors (40, 46) to draw a preset biased current from an amplifier (60), thereby changing the amplifier from a first gain to a second gain condition. The circuit (10) therefor sets the gain of the amplifier (60) through switching action utilizing hysteresis, the switching being a function of the amplitude of the residual current passed through the transistor (20).

5 Claims, 2 Drawing Figures

LOW LOOP CURRENT SWITCH LATCH CIRCUIT

TECHNICAL FIELD

The present invention relates in general to a current activated switch and more particularly to a switch which operates in response to a telephone loop current to set the gain of an amplifier.

BACKGROUND OF THE INVENTION

In communication loops utilizing telephone lines, a subscriber's device, e.g. a telephone, is normally connected across the telephone lines. When the subscriber's device is activated, a current is drawn, which is termed the loop current. A central station recognizes the increase in loop current as an indication that the subscriber's device is operational. For a typical telephone line, the current available from the central station is in the range of 20 to 100 milliamps. This is due to the telephone company using lines of different impedances and lengths. The current drawn through the telephone lines results in a voltage drop across the line. The voltage level at the central station is normally 48 volts whereas the voltage at the subscriber's device is in the range of 4 to 10 volts. However, in certain applications, the telephone company utilizes a subscriber carrier system to extend a telephone line to an additional subscriber. The subscriber carrier system provides a lower voltage to the added subscriber and has only little current drive capability. Since there is no way of knowing in advance the application in which the subscriber device is to be used, the subscriber's device must be operable with any length of conventional telephone line or on a subscriber carrier system.

Due to the use of relatively high impedance telephone loop systems, there exists a need for a circuit that senses the lower loop current available and automatically compensates the subscriber's device to work with the lower loop current system. This alleviates any need for a special subscriber device to operate with a high impedance loop.

SUMMARY OF THE INVENTION

A selected embodiment of the present invention comprises a switch latch circuit for controlling the bias current through an amplifier. The switch latch circuit includes circuitry for monitoring a residual current, which is proportional to the loop current through a telephone line, to produce a control current that is inversely proportional to the residual current. A circuit which includes cross-coupled transistors is connected to receive the control current and switch with hysteresis between a first state and a second state as a function of the control current. Further circuitry is coupled to the cross-coupled transistor circuit for drawing a predetermined bias current from the amplifier when the cross-coupled transistor circuit is in a selected one of the first or second states.

The gain of the amplifier is proportional to the bias current and therefor the gain of the amplifier is proportional to the loop current drawn from the telephone line.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
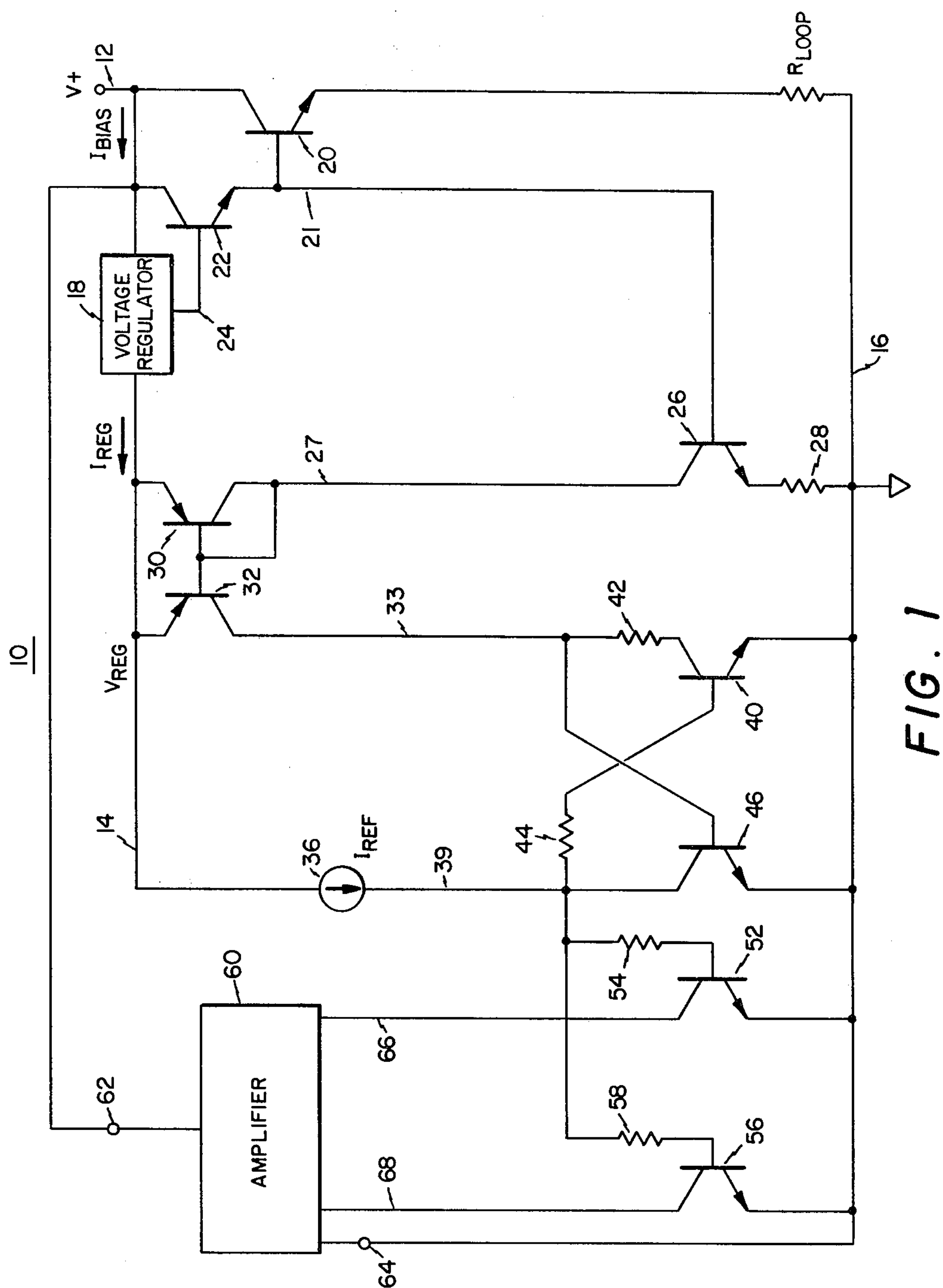
FIG. 1 is a schematic illustration of a circuit for sensing a residual current and activating a switch latch to control amplifier gain.

Referring now to FIG. 1, a circuit 10 is shown for sensing a residual current to set a switch latch which in turn sets the gain of an amplifier. A particular application of the circuit 10 is within a subscriber circuit in a telephone system. Circuit 10 includes a V+ terminal 12, a $V_{reg}$ power supply terminal 14 and a negative supply terminal 16. A voltage regulator circuit 18 produces from the V+ terminal 12 a voltage of approximately 3 volts on the $V_{reg}$ terminal 14.

An NPN transistor 20 has the collector thereof connected to the V+ terminal 12 and the base thereof connected to a node 21. An NPN transistor 22 has the collector thereof connected to the V+ terminal 12, the emitter thereof connected to the node 21 and the base thereof connected to a control output terminal 24 of the regulator 18. A resistor $R_{loop}$ is connected between the negative power supply terminal 16 and the emitter of the transistor 20. A transistor 26 has the base thereof connected to the node 21 and the collector thereof connected to a node 27. A resistor 28 is connected between the negative supply terminal 16 and the emitter of transistor 26.

As will be described below, the output of the regulator 18 supplies a current $I_{reg}$ to all circuitry connected between the $V_{reg}$ terminal 14 and the negative power supply terminal 16. It is also necessary, when connecting a telephone circuit such as shown in FIG. 1 to the telephone lines, that sufficient current be drawn at the V+ terminal 12 to lower the voltage at the V+ terminal 12 to the range of 4 to 10 volts. The current required to operate all the active devices connected to the V+ terminal 12, including $I_{reg}$, is denoted as $I_{BIAS}$. To lower the voltage on the V+ terminal to the 4 to 10 volts level, however, requires additional current to be drawn through the telephone lines. This is accomplished by dumping excess current not required for $I_{BIAS}$ into the resistor $R_{loop}$. The output control terminal 24 of the voltage regulator 18 controls the transistors 20 and 22 such that a sufficient amount of current is shunted away from the V+ terminal 12 through the resistor $R_{loop}$. Since the current supplied by the central station must travel through a relatively high impedance line, this current shunting action to the resistor $R_{loop}$ provides sufficient voltage drop to lower the voltage on the V+ terminal 12 to the allowable range of 4 to 10 volts, preferably approximately 5.0 volts.

The transistor 26 and the resistor 28 operate to provide a current which is proportional to the current through $R_{loop}$. Since the series combination of the emitter of the transistor 20 and the resistor $R_{loop}$ is in parallel with the series combination of the emitter of the transistor 26 and the resistor 28, the collector-to-emitter current through the transistor 26 is proportional to the collector-to-emitter current of the transistor 20. The currents are related by the ratio of the value of the resistor $R_{loop}$ divided by the value of the resistor 28. In the illustrated embodiment this value is approximately 1/680. The purpose for having a low current through the resistor 28 is to minimize the current drain from the regulator 18.

A PNP transistor 30 has the emitter thereof connected to the $V_{reg}$ terminal 14, the collector thereof connected to the node 27 and the base thereof connected to the node 27. A PNP transistor 32 has the emitter thereof connected to the $V_{reg}$ terminal 14, the base thereof connected to the node 27 and the collector thereof connected to a node 33. The transistors 30 and 32 comprise a current mirror with the transistor 30 comprising the master side of the current mirror and the transistor 32 comprising the slave side of the current mirror. The current through the transistor 30 is determined by the current through the transistor 26. As described above, the current through the transistor 26 is proportional to the current through the resistor $R_{loop}$. The transistor 32 is designed to source a current that is proportional to the current through the transistor 30.

A current source 36 is connected between the positive supply terminal 14 and a node 39. The current source 36 provides a constant current $I_{ref}$.

An NPN transistor 40 has the emitter thereof connected to the negative supply terminal 16, the collector thereof connected to a first terminal of a resistor 42 and the base thereof connected to a first terminal of a resistor 44. An NPN transistor 46 has the emitter thereof connected to the negative supply terminal 16, the collector thereof connected to the node 39 and the base thereof connected to the node 33. The resistor 42 has the second terminal thereof connected to node 33 and the resistor 44 has the second terminal thereof connected to node 39.

An NPN transistor 52 has the emitter thereof connected to the negative supply terminal 16 and the base thereof connected to a first terminal of a resistor 54. An NPN transistor 56 has the emitter thereof connected to the negative terminal 16 and the base thereof connected to a first terminal of a resistor 58. The resistor 54 has the second terminal thereof connected to the node 39 and the resistor 58 also has the second terminal thereof connected to the node 39. It should be understood that a plurality of NPN transistors can be connected in parallel to the transistors 52 and 56 with a base resistor similar to the resistors 54 and 58 connected to the node 39.

An amplifier circuit 60 has a supply terminal 62 connected to the V+ terminal 12, a ground terminal 64 connected to the negative supply terminal 16, a control input line 66 connected to the collector of the transistor 52 and a control input line 68 connected to the collector terminal of transistor 58. It should be understood that a plurality of amplifier circuits can be incorporated in parallel to the amplifier circuit 60 with each of the respective control inputs connected to the collector of an individual NPN transistor as described above. The amplifier 60 has a first gain when no bias current is drawn through lines 66 and 68 and a second greater gain when bias current is drawn through lines 66 and 68.

Referring further to FIG. 1, a more detailed explanation of the operation of circuit 10 is presented. As the current through $R_{loop}$ increases or decreases, the current through the transistor 26 and the resistor 28 tracks proportionally. This, in turn, causes the collector-to-emitter current of the transistor 32 to proportionally increase or decrease. When the circuit 10 is first turned on, the current from transistor 32 passes through node 33 to the base of transistor 46 and saturates the transistor 46, thus turning it on. This pulls the voltage on node 39 down to essentially the voltage level of the negative ground terminal 16. The current flowing through transistor 46 is essentially the reference current through the current source 36. When the voltage on the node 39 is pulled down to the voltage on the negative supply terminal 16, no current flows through the resistors 54 and 58, thus turning off the transistors 52 and 56. This is referred to as the "off" state for a switch latch circuit which includes the cross-coupled transistors 40 and 46.

As the current through $R_{loop}$ decreases, the current supplied by the transistor 32 reaches a level at which insufficient base-to-emitter current is supplied to the transistor 46 to maintain it in saturation. When this occurs, the voltage on the node 39 increases. The current supplied by the current source 36 flows through the resistors 44, 54 and 58 to supply base-to-emitter current for the transistors 40, 52 and 56 respectively. This drives the transistors 52 and 56 to saturation, thereby lowering the potential on the collectors thereof and drawing current therethrough. This increases the bias current from amplifier 60 thereby increasing its gain to a second state. This is termed the "on" state for the switch latch circuit which includes transistors 40 and 46.

The current flowing through the resistor 44 saturates the transistor 40 causing current to flow through the resistor 42. The current flowing through the resistor 42 and transistor 40 is supplied by the transistor 32 which provides a current proportional to the current flowing through the resistor $R_{loop}$, as described above. As long as the voltage drop between the node 33 and the negative supply terminal does not exceed the emitter-to-base voltage of transistor 46, the switch latch remains in the "on" state. When the current through the resistor $R_{loop}$ increases to a sufficient level, the current supplied by the transistor 32 increases the voltage at the node 33 to a level to saturate the transistor 46. As the transistor 46 begins to saturate, it shunts a portion of the current supplied by the current source 36 such that the current through the resistor 44 decreases to turn off the transistor 40. The transition from the "on" state to the "off" state of the switch latch occurs at a different current level through the resistor $R_{loop}$ as compared to the current level required for the transition from the "off" state to the "on" state. This difference provides hysteresis for the latching operation of the switch latch circuit. Transistor 46 is maintained in the "on" state by all the current that passes through transistor 32. But when transistor 46 is off the current from transistor 32 is split between transistor 46 and the path through resistor 42. Thus a greater current must be passed through transistor 32 to turn on transistor 46 than is required to maintain it "on". This provides the hysteresis for the current switching levels through $R_{loop}$.

The hysteresis allows the switch latch circuit to change from the "off" state to the "on" state when the loop current falls below approximately 10 milliamps. This "on" state is "latched" or held until the loop current again increases to above approximately 18 milliamps where the switch latch circuit makes the transition back to the "off" state. This change in current can occur when an auxiliary circuit, such as a dual tone generator, is activated and draws additional current.

Figure 2:
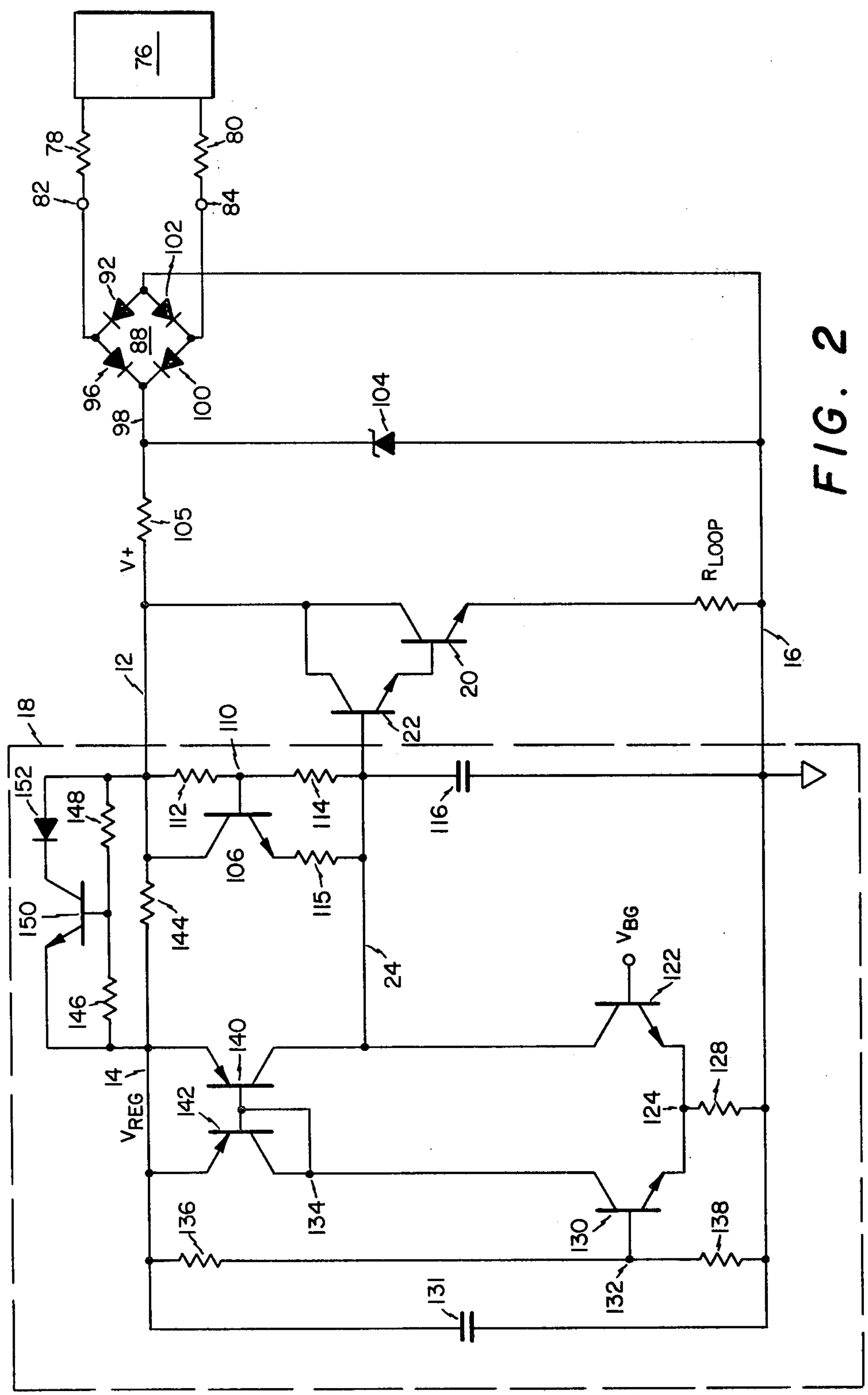
FIG. 2 is a schematic illustration of a voltage regulator circuit utilized in the circuit of the present invention.

Referring now to FIG. 2, there is shown the voltage regulator circuit 18 of FIG. 1 together with additional elements of a telephone system. A central station 76 applies a DC voltage to a two-conductor line that has an internal impedance depending upon the length of the particular line. The line and its impedance are represented by a resistor 78 and a resistor 80. Resistor 78 is connected between the central station 76 and an input terminal 82. The resistor 80 is connected between the central station 76 and an input terminal 84. The input terminals 82 and 84 comprise the loop connection terminals of the subscriber's device.

A bridge circuit 88 includes a diode 92 which has the cathode thereof connected to the terminal 82 and the anode thereof connected to the terminal 16. A diode 96 has the anode thereof connected to the terminal 82 and the cathode thereof connected to a node 98. A diode 100 has the anode thereof connected to the terminal 84 and the cathode thereof connected to the node 98. A diode 102 has the anode thereof connected to the negative supply terminal 16 and the cathode thereof connected to the terminal 84. The bridge 88 comprises a full wave rectifier which allows the subscriber's device to be connected to the telephone line independent of voltage polarity.

A zener diode 104 has the cathode thereof connected to node 98 and the anode thereof connected to the negative supply terminal 16. The zener diode 104 prevents the voltage supplied to the subscriber circuit from surpassing the zener threshold. A zener diode having a threshold of approximately 10 volts is utilized in the illustrated embodiment of the present invention.

A resistor 105 is connected between node 98 and the V+ terminal 12.

The circuitry of the voltage regulator 18 of FIG. 1 is shown within the dashed lines of FIG. 2. An NPN transistor 106 has the base thereof connected to a node 110 and the collector thereof connected to the V+ terminal 12. A resistor 112 is connected between the node 110 and the V+ terminal 12. A resistor 114 is connected between node 110 and the control terminal 24. A resistor 115 is connected between the emitter of the transistor 106 and the control terminal 24.

A capacitor 116 is connected between the control terminal 24 and the negative supply terminal 16. The capacitor 116 shunts AC signals that are present on the control terminal 24 to ground and provides a voltage bias to the base of transistor 122.

An NPN transistor 122 has the base thereof connected to receive a voltage reference $V_{BG}$, the emitter thereof connected to a node 124 and the collector thereof connected to the control terminal 24. For the illustrated circuit the reference voltage $V_{BG}$ is provided by a band gap reference circuit.

A resistor 128 is connected between the node 124 and the negative supply terminal 16. An NPN transistor 130 has the emitter thereof connected to the node 124, the base thereof connected to a node 132 and the collector thereof connected to a node 134. A resistor 136 is connected between the $V_{reg}$ terminal 14 and the node 132. A resistor 138 is connected between the node 132 and the negative supply terminal 16. A capacitor 131 is connected between the $V_{reg}$ terminal 14 and negative supply terminal 16.

A PNP transistor 140 has the emitter thereof connected to the $V_{reg}$ terminal 14, the collector thereof connected to the control terminal 24 and the base thereof connected to the node 134. A PNP transistor 142 has the emitter thereof connected to the $V_{reg}$ terminal 14, the base thereof connected to the node 134 and the collector thereof connected to the node 134. A resistor 144 is connected between the V+ terminal 12 and the $V_{reg}$ terminal 14.

A series pair of resistors 146 and 148 is connected between nodes 12 and 14. An NPN transistor 150 has the base thereof connected to the junction of transistors 146 and 148 and the emitter thereof connected to node 14. A diode 152 has its anode connected to terminal 12 and its cathode connected to the collector of transistor 150.

Referring further to FIG. 2, the operation of the regulator circuit 18 is described in detail. The transistor 106 together with resistors 112, 114, and 115 comprise a start-up circuit to quickly boost the voltage at node 24 when power is initially applied to the overall circuit. Likewise, transistor 150 together with diode 152 and resistors 146 and 148 comprise a start-up circuit to rapidly boost the voltage at node 14 when power is applied to node 12.

The voltage drop across the base-to-emitter junction of the transistor 122 is essentially constant and is equal the voltage across the emitter-to-base junction of the transistor 130. The transistors 122 and 130 pass sufficient current to the resistor 128 such that the same emitter-to-base voltage is maintained on both transistors 122 and 130. The voltage on the base of the transistor 130 at the node 132 is the same as the voltage drop across the resistor 138. The voltage at node 132 is maintained essentially equal to the reference voltage $V_{BG}$.

The current through the transistor 130 is also passed through the collector-to-emitter terminals of the transistor 142. The transistors 142 and 140 are connected in a current mirror fashion with the transistor 142 comprising the master side of the current mirror and the transistor 140 comprising the slave side of the current mirror. Both transistors 140 and 142 are fabricated in a similar configuration, therefore the currents through transistors 140 and 142 are essentially equal.

If the voltage on the regulated supply terminal 14 increases, this causes an increase in the voltage across the resistor 138 since the resistors 136 and 138 are connected as a voltage divider. As the base voltage on the transistor 130 increases, the base-to-emitter current thereof also increases, thus increasing the collector-to-emitter current thereof. This increased collector-to-emitter current in the transistor 130 increases the voltage across the resistor 128. An increase in the voltage at node 124 decreases the base-to-emitter voltage of the transistor 122. This decrease in base-to-emitter voltage on the transistor 122 results in a decrease of base-to-emitter current with a resulting decrease in collector-to-emitter current thereof. Since the current through the transistor 130 has increased due to the increasing voltage on the $V_{reg}$ terminal 14, the current through the transistor 142 also increases. With the associated decrease in current through the transistor 122, this additional current charges capacitor 116 and flows into resistors 114 and 112 and to the base of the transistor 22. The increase in base voltage of transistor 22 causes an increase in the collector-to-emitter current of the transistor 20 to the resistor $R_{loop}$. As current is shunted from the V+ terminal 12, more current is drawn from the central station 76. This causes an increased voltage drop across the resistors 78 and 80, thus causing a decrease in the voltage at terminal 12 and at the $V_{reg}$ terminal 14.

When the subscriber's device is initially turned on, the resistors 112 and 114 supply current from the V+ terminal 12 to initially charge up the capacitor 116. When regulation has been achieved, the resistors 112 and 114 supply a forward bias to the base-to-emitter junction of the transistors 20 and 22. The capacitor 116 also filters from terminal 24 AC signals which are received from the telephone lines.

The resistor 144 provides a voltage drop determined by the amount of current $I_{reg}$, that is drawn from the $V_{reg}$ terminal 14, as shown in FIG. 1. This voltage drop allows the voltage on the V+ terminal 12 to be approximately 0.8 to 1.0 volt higher than the voltage on the $V_{reg}$ terminal 14.

In summary, a switch latch circuit having hysteresis is disclosed wherein the switch latch current state is controlled by the excess amount of loop current drawn from a telephone loop circuit. For situations in which the loop current has been decreased below a minimum level, the switch latch is activated to control circuitry that increases the bias current and therefore gain of an amplifier. The hysteresis prevents the switch latch current from entering a marginal area when the loop current is near the switching threshold. The hysteresis prevents the trip point for the on-off transition of the off-on transition from being the same thereby preventing erratic operation. For example, when the subscriber's device is transmitting a dialing tone the loop current momentarily increases. Hysteresis prevents erratic switching under this condition.

Although the preferred embodiment of the invention has been described in detail, it should be understood that various changes, substitutions and alternations can be made therein without departing from the spirit and scope of the invention as defined by the appended claims.

I claim:

1. A switch latch circuit for controlling a bias current of an amplifier in a telephone subscriber's device powered by the telephone lines, comprising:

means for monitoring a residual current to produce a control current proportional to said residual current;

cross-coupled transistor means connected to receive said control current and switch with hysteresis between a first state and a second state as a function of said control current, and means coupled to said cross-coupled transistor means for drawing a predetermined bias current from said amplifier when said cross-coupled transistor means is in a selected one of said states.

2. The switch latch circuit recited in claim 1 wherein said means for monitoring a residual current to produce a control current comprises:

a bipolar first transistor which passes said residual current through the emitter and collector terminals thereof and has the collector terminal thereof connected to a first power terminal;

a bipolar second transistor having the base terminal thereof connected to the base terminal of said first bipolar transistor;

a first resistor connected between the emitter terminal of said first transistor and a second power terminal; and a current mirror circuit including a master bipolar third transistor having the base and collector terminals thereof connected to the collector terminal of said second transistor and having the emitter terminal thereof connected to a third power terminal, said current mirror circuit further including a slave bipolar fourth transistor having the base terminal thereof connected to the base terminal of said third transistor, the emitter terminal thereof connected to said third power terminal wherein said control current is passed between the collector and emitter terminals of said fourth transistor.

3. The switch latch circuit recited in claim 1 wherein said cross-coupled transistor means comprises:

a first resistor having a first terminal connected to receive said control current;

a first bipolar transistor having the collector terminal thereof connected to a second terminal of said first resistor and the emitter terminal thereof connected to a first power terminal;

a second bipolar transistor having the base terminal thereof connected to the first terminal of said first resistor and the emitter terminal thereof connected to said first power terminal;

a second resistor connected between the base terminal of said first transistor and the collector terminal of said second transistor; and a current source for providing a constant current from a second power terminal to the collector terminal of said second transistor.

4. The switch latch circuit recited in claim 1 wherein said means for drawing a predetermined bias current comprises:

a resistor having a first terminal thereof connected to a node of said cross-coupled transistor means, said node driven to first and second voltage states; and a bipolar transistor having the base terminal thereof connected to a second terminal of said resistor having the emitter terminal thereof connected to a power terminal and having the collector terminal thereof connected to draw a bias current from said amplifier.

5. A switch latch circuit for controlling a bias current of an amplifier in response to a residual current divided from a telephone line, the switch latch circuit comprising:

a first transistor having the collector terminal thereof connected to a first power terminal and passing said residual current through the collector and emitter terminals thereof;

a second transistor having the base terminal thereof connected to the base terminal of said first transistor;

a first resistor connected between the emitter terminal of said second transistor and a second power terminal;

a first current mirror circuit including a master third transistor having the emitter terminal thereof connected to a third power terminal and the base and collector terminals thereof connected to the collector terminal of said second transistor and including a slave fourth transistor having the emitter terminal thereof connected to said third power terminal and the base terminal thereof connected to the base terminal of said third transistor;

a second resistor having a first terminal thereof connected to the collector terminal of said fourth transistor;

a fifth transistor having the collector terminal thereof connected to a second terminal of said second resistor and the emitter terminal thereof connected to said second power terminal;

a sixth transistor having the base terminal thereof connected to the first terminal of said second resistor and the emitter terminal thereof connected to said second power terminal;

a third resistor connected between the collector terminal of said sixth transistor and the base terminal of said fifth transistor;

a current source for providing a constant current from said third power terminal to the collector terminal of said sixth transistor;

a fourth resistor having a first terminal connected to the collector terminal of said sixth transistor; and a seventh transistor having the base terminal thereof connected to a second terminal of said fourth resistor, having the emitter terminal thereof connected to said second power terminal and having the collector terminal thereof connected to said amplifier for drawing said bias current therefrom in response to the amplitude of said residual current.

* * * * *